US009976606B2

(12) United States Patent
Squarcini et al.

(10) Patent No.: US 9,976,606 B2
(45) Date of Patent: May 22, 2018

(54) MECHANICAL COMBUSTION-ENGINE-DRIVEN FLUID PUMP

(75) Inventors: Raffaele Squarcini, Leghorn (IT); Elisa Bartalesi, San Gimignano (IT); Giacomo Armenio, Leghorn (IT); Francesco Bucchi, Pisa (IT); Rocco Rizzo, Pisa (IT); Antonio Musolino, Pisa (IT); Paola Forte, Pisa (IT); Francesco Frendo, Viareggio-Lucca (IT); Alessandro Franceschini, Lucca (IT)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 582 days.

(21) Appl. No.: 14/422,701

(22) PCT Filed: Aug. 23, 2012

(86) PCT No.: PCT/EP2012/066464
§ 371 (c)(1),
(2), (4) Date: May 28, 2015

(87) PCT Pub. No.: WO2014/029445
PCT Pub. Date: Feb. 27, 2014

(65) Prior Publication Data
US 2015/0260240 A1 Sep. 17, 2015

(51) Int. Cl.
*F16D 37/02* (2006.01)
*F04B 17/05* (2006.01)
(Continued)

(52) U.S. Cl.
CPC .............. *F16D 37/02* (2013.01); *F04B 17/05* (2013.01); *F16D 27/01* (2013.01); *F16D 37/008* (2013.01); *F16D 2037/004* (2013.01)

(58) Field of Classification Search
USPC ....................................................... 192/84.3
See application file for complete search history.

(56) References Cited

U.S. PATENT DOCUMENTS

| | | | | | |
|---|---|---|---|---|---|
| 2,575,360 | A | * | 11/1951 | Rabinow | F16D 37/02 180/65.1 |
| 2,845,157 | A | * | 7/1958 | Gambell | F16D 27/01 192/21.5 |

(Continued)

FOREIGN PATENT DOCUMENTS

| | | |
|---|---|---|
| CN | 101233338 A | 7/2008 |
| CN | 101915277 A | 12/2010 |

(Continued)

*Primary Examiner* — Mark A Manley
(74) *Attorney, Agent, or Firm* — Norman B. Thot

(57) ABSTRACT

A mechanical combustion-engine-driven fluid pump includes an input shaft driven by a combustion engine, a pumping unit comprising a pump rotor, and a clutch arranged between the input shaft and the pump rotor. The clutch comprises an input clutch body, an output clutch body, an electroconductive element, a permanent magnet element, and an actuator. The clutch transfers a rotation of the input clutch body to the output clutch body in an engaged clutch state. The closed clutch liquid gap is formed between the input clutch body and the output clutch body, and is filled with a magneto-rheological clutch liquid. The electroconductive element co-rotates with the output clutch body. The permanent magnet element co-rotates with the input clutch body and is shiftable between an engaged position and a disengaged position. The actuator moves the permanent magnet element between the engaged position and the disengaged position.

11 Claims, 4 Drawing Sheets

(51) Int. Cl.
*F16D 37/00* (2006.01)
*F16D 27/01* (2006.01)

(56) References Cited

U.S. PATENT DOCUMENTS

| | | | |
|---|---|---|---|
| 5,848,678 A * | 12/1998 | Johnston | F16D 37/02 |
| | | | 188/267.2 |
| 5,906,480 A | 5/1999 | Sabelström et al. | |
| 5,967,273 A | 10/1999 | Hampton | |
| 7,422,093 B2 | 9/2008 | Murty et al. | |
| 8,016,092 B2 | 9/2011 | McDaniel | |
| 2002/0096132 A1* | 7/2002 | Stretch | F01P 7/164 |
| | | | 123/41.12 |
| 2007/0022979 A1 | 2/2007 | Gradu et al. | |
| 2008/0135367 A1 | 6/2008 | Steinwender | |
| 2009/0022606 A1* | 1/2009 | Togawa | F01P 5/12 |
| | | | 417/364 |
| 2009/0266666 A1 | 10/2009 | McDaniel | |
| 2012/0090938 A1 | 4/2012 | Maas et al. | |

FOREIGN PATENT DOCUMENTS

| | | | |
|---|---|---|---|
| CN | 102341609 A | | 2/2012 |
| DE | 10 2007 020 867 A1 | | 11/2008 |
| EP | 0 553 010 A1 | | 7/1993 |
| EP | 1 225 361 A1 | | 7/2002 |
| FR | 1.101.667 A | | 10/1955 |
| GB | 708557 | | 5/1954 |
| GB | 751382 | * | 6/1956 |
| GB | 2 211 572 A | | 7/1989 |
| JP | 57-152472 A | | 9/1982 |
| JP | 61-248924 A | | 11/1986 |
| JP | 5-58190 A | | 3/1993 |
| JP | 5-252800 A | | 9/1993 |
| JP | 6-294425 A | | 10/1994 |
| JP | 8-72700 A | | 3/1996 |
| JP | 8-277853 A | | 10/1996 |
| JP | 9-509119 A | | 9/1997 |
| JP | 11-201193 A | | 7/1999 |
| JP | 2011-182574 A | | 9/2011 |

* cited by examiner

MECHANICAL COMBUSTION-ENGINE-DRIVEN FLUID PUMP

CROSS REFERENCE TO PRIOR APPLICATIONS

This application is a U.S. National Phase application under 35 U.S.C. § 371 of International Application No. PCT/EP2012/066464, filed on Aug. 23, 2012. The International Application was published in English on Feb. 27, 2014 as WO 2014/029445 A1 under PCT Article 21(2).

FIELD

The present invention relates to a mechanical combustion-engine-driven fluid pump which is driven by an internal combustion engine and which provides a liquid, a pressurized gas, or a vacuum to an automotive unit.

BACKGROUND

The fluid pump can be a lubricant pump, a coolant pump, a vacuum pump, or a pump providing pressurized gas, for example, pressurized air. The mechanical fluid pump is not driven by an electrical rotor, but is directly coupled to the combustion engine. The rotational speed of the fluid pump is therefore proportional to the rotational speed of the combustion engine so that the fluid pump always rotates even if no need exists for a fluid supply or for a suction activity to create a vacuum.

U.S. Pat. No. 7,422,093 B2 describes a fluid pump for providing a pressurized liquid for a hydraulic power steering. The fluid pump is provided with a magneto-rheological clutch so that the pump performance can be controlled depending on the fluid demand and pressure demand of the power steering.

A risk of failure is not acceptable for vital fluid pumps, such as a lubricant pump, a coolant pump, or a vacuum pump for a brake assistance system.

SUMMARY

An aspect of the present invention is to provide a failsafe mechanical combustion-engine-driven fluid pump with a magneto-rheological clutch.

In an embodiment, the present invention provides a mechanical combustion-engine-driven fluid pump includes an input shaft configured to be directly driven by a combustion engine, a pumping unit comprising a pump rotor, and a clutch provided as a combined magneto-rheological and eddy-current clutch arranged between the input shaft and the pump rotor. The clutch comprises an input clutch body, an output clutch body, an electroconductive element, a permanent magnet element, and an actuator. The clutch is configured to transfer a rotation of the input clutch body to the output clutch body in an engaged clutch state. The closed clutch liquid gap is formed between the input clutch body and the output clutch body. The closed clutch liquid gap is filled with a magneto-rheological clutch liquid. The electroconductive element is configured to co-rotate with the output clutch body. The permanent magnet element is configured to co-rotate with the input clutch body and to be shiftable between an engaged position and a disengaged position. In the engaged position, a magnetic field of the permanent magnet element penetrates the closed clutch liquid gap with a high magnetic flux and the permanent magnet element is in a position which is close to the electroconductive element. In the disengaged position, the magnetic field of the permanent magnet element in the closed clutch liquid gap is less than in the engaged position, and the permanent magnet element is in a position which is remote from the electroconductive element. The actuator is configured to move the permanent magnet element between the engaged position and the disengaged position.

BRIEF DESCRIPTION OF THE DRAWINGS

The present invention is described in greater detail below on the basis of embodiments and of the drawings in which.

DETAILED DESCRIPTION

Figure 1:
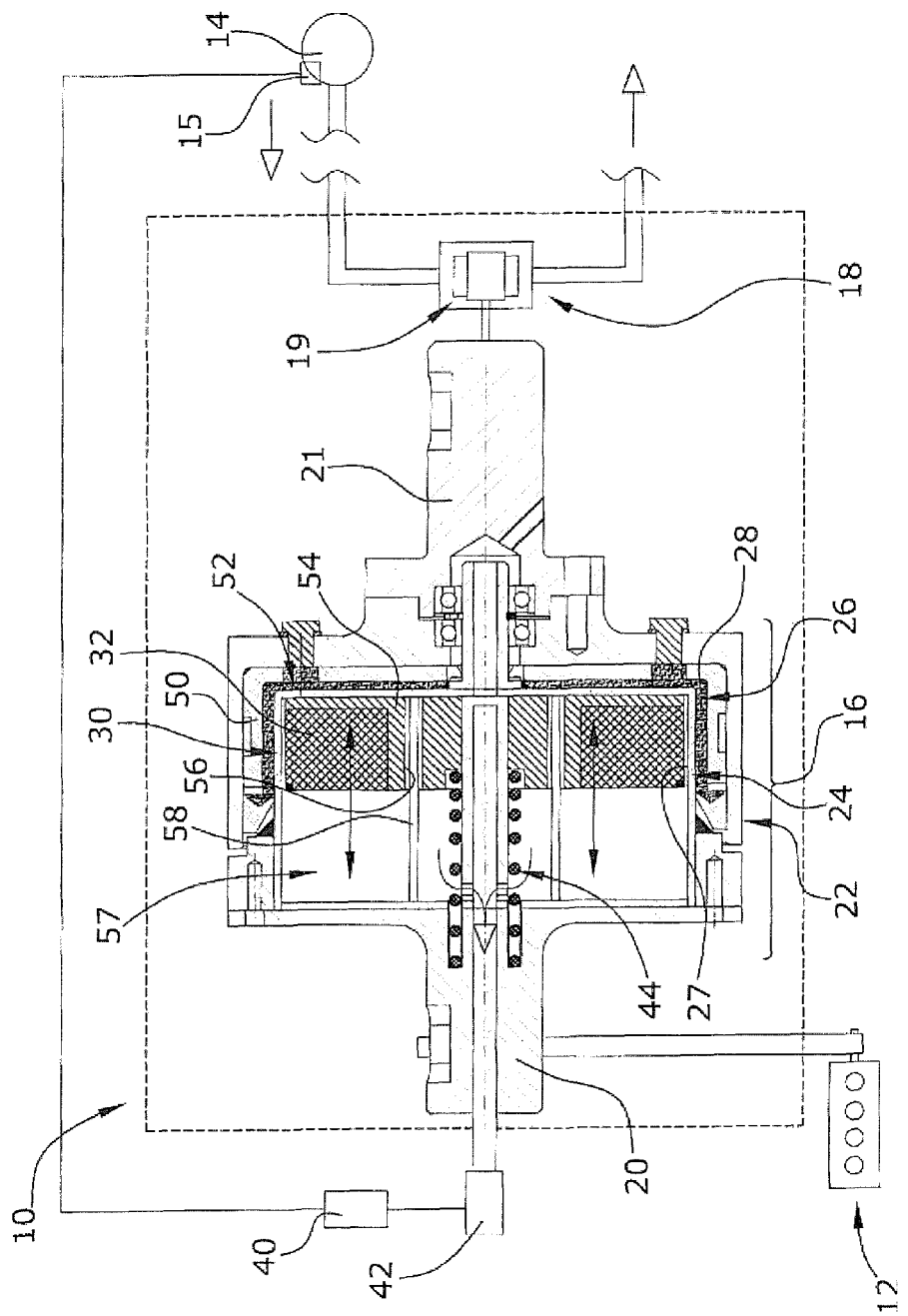
FIG. 1 shows a mechanical combustion-engine-driven fluid pump with an embodiment of a clutch with cup-like clutch bodies in longitudinal cross-section in the engaged state.

The fluid pump according to the present invention is provided with an input shaft which is directly driven by the combustion engine and with a pumping unit with a pump rotor for pumping the fluid which can be a liquid or a gas. The term "directly driven" as used herein means that no disengagable clutch exists between the rotational element of the engine and the input shaft of the pump. The input shaft of the pump can be driven by the engine via a belt, gear wheels, or by a direct coupling with the camshaft or the crankshaft of the engine.

The clutch is a combination of a magneto-rheological clutch and an eddy-current clutch, whereby both clutch arrangements are engaged and disengaged by one single movable permanent magnet element. The clutch is provided between the input shaft and the pump rotor and comprises a clutch liquid gap between two clutch bodies. One clutch body is directly connected to the input shaft, and the other clutch body is directly connected to the pump rotor. The clutch liquid gap between the two clutch bodies is filled with a magneto-rheological clutch liquid which has a relatively high viscosity when a magnetic field is present and which has a relatively low viscosity when no magnetic field is present. The term "liquid" as used in context with the magneto-rheological liquid is not to be taken literally, but is to be understood as a kind of a magneto-rheological fluid which can also somehow be solid when activated by a magnetic field.

The magnetic field for increasing the viscosity of the magneto-rheological clutch liquid is not generated by an electromagnetic means, but is generated by a permanent magnet element which is shiftable between a disengaged position in which the permanent magnet element's magnetic field penetration flux in the clutch liquid gap is low, and an engaged position in which the magnetic field flux penetration in the clutch liquid gap is high. In its engaged position, the permanent magnet is close to the clutch liquid gap, and in the disengaged position, the permanent magnet is more distant from the clutch liquid gap. The permanent magnet element co-rotates with the input clutch body so that the permanent magnet element always rotates with the rotational speed of the input shaft.

An electroconductive element is provided which co-rotates with the output clutch body. In the engaged position, the permanent magnet element is close to the electroconductive element, whereas in the disengaged position, the permanent magnet element is remote from the electroconductive element. In the engaged position of the permanent magnet element, a relevant eddy-current effect is generated so that the electroconductive element and the enclosed output clutch body are driven by the input side as long as there is a relevant rotational speed difference between the permanent magnet element and the electroconductive element. In the disengaged position of the permanent magnet element, no relevant eddy-current effect between the permanent magnet element and the electroconductive element is present.

The magnet element is moved between the engaged and the disengaged position by a separate magnet element actuator.

Since the magnetic field for penetrating the clutch liquid gap and the magneto-rheological clutch liquid therein is not generated by an electromagnet, the magneto-rheological clutch can generally also be engaged if the control means of the pump fails. The eddy-current clutch arrangement is also not dependent on the activation of an electromagnetic means.

Even if the mechanical-rheological clutch liquid should disappear from the clutch liquid gap, a substantive engagement via the eddy-current clutch arrangement is still present so that a substantive pumping performance is provided. The fluid pump is consequently failsafe and is therefore suitable for vital automotive pumps such as a lubricant pump, a coolant pump, or a vacuum pump for a brake assistance system.

The magneto-rheological eddy-current clutch can generally also be combined with other automotive devices around or not around the engine, or even outside automotive applications.

In an embodiment of the present invention, the permanent magnet element can, for example, be provided so as to be shiftable in an axial direction. The permanent magnet element can, for example, be magnetized in a circumferential direction, but can generally also be magnetized in other directions, for example, in a diametral, a radial, or an axial direction.

The permanent magnet element can, for example, be pretensioned by a passive pretension element into its engaged position. If the actuator fails, the pretension element pushes the permanent magnet element into the engaged position. This arrangement makes the clutch concept totally failsafe. The passive pretension element can, for example, be a spring or another permanent magnet. The passive pretension element does not, however, need any external energy to provide the pretension force.

In an embodiment of the present invention, a separate shift body can, for example, be provided which comprises the permanent magnet element and which is provided with an axial guiding means which interacts with an axial guiding means of the input clutch body. The shift body itself is guided axially and holds the separate permanent magnet element. The permanent magnet element can therefore have a simple ring-like form, whereas the shift body which is not permanently magnetized can have a relatively complex form and structure. The shift body and the permanent magnet element can be provided as generally rotation-symmetric parts.

In an embodiment of the present invention, the electroconductive element can, for example, be a part of the output clutch body. The electroconductive element can, for example, be a disk-like and/or a cylindrical part of the output clutch body.

In an embodiment of the present invention, the clutch bodies can, for example, be cup-shaped and form a cup-shaped clutch liquid gap between the clutch bodies. The clutch bodies are provided with a disk-like section and with a cylindrical section. The permanent magnet is, in its engaged position, positioned inside the ring-like shaped cavity defined by the cup-shaped clutch liquid gap. Since the clutch liquid gap between the two clutch bodies is not only disk-shaped, but also comprises a cylindrical portion, the total gap surface area is significantly increased and is provided with a long lever arm of force to transmit high torque values without increasing the total diameter of the clutch.

In an embodiment of the present invention, the clutch can, for example, be provided as a multi-disc clutch which is provided with at least two radial input disks and at least two radial output disks, whereby the disks define radial clutch liquid gaps between them. The multi-disk configuration of the clutch allows a very compact diameter of the clutch.

In an embodiment of the present invention, the radial input disks can, for example, be ferromagnetic and the radial output disks can, for example, be provided as electroconductive elements. In an embodiment, the radial output disks can, for example, be provided with numerous openings, for example, with radial slits, to realize a strong eddy-current effect.

In an embodiment of the present invention, the actuator can, for example, be provided as a vacuum actuator. The vacuum actuator is magnetically neutral and does not generate any electromagnetic field which could penetrate the clutch liquid gap filled with the magneto-rheological clutch liquid or could have an effect on the electroconductive element.

The actuator can also be provided as an electromagnetic actuator in form of an electromagnetic coil. If the electromagnetic actuator is activated, the shiftable permanent magnet element is pulled or pushed into its disengaged position, i.e., distant from the clutch liquid gap.

Two embodiments of the present invention are described below under reference to the enclosed drawings.

Figure 2:
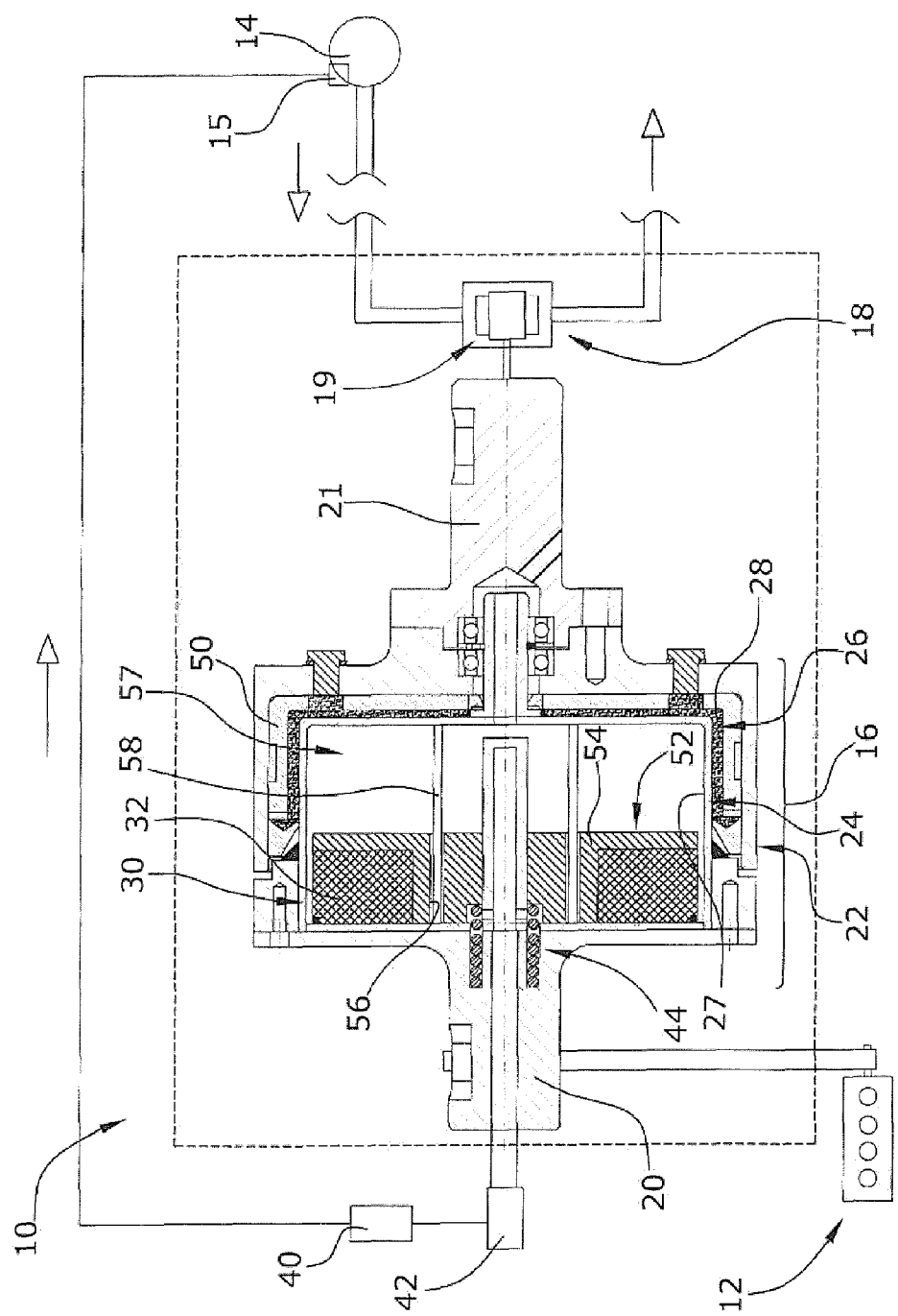
FIG. 2 shows the fluid pump of FIG. 1 in the disengaged state.

FIGS. 1 and 2 show a typical automotive arrangement consisting of an internal combustion engine 12, a mechanical fluid pump 10 directly driven by the internal combustion engine 12, and a vacuum-driven pneumatic brake assistance unit 14. The fluid pump 10 is designed as a vacuum pump and provides low pressure to the brake assistance unit 14. The internal combustion engine 12 is mechanically directly connected to an input shaft 20 of a clutch 16 so that the input shaft 20 always co-rotates with a rotational speed directly proportional to the rotational speed of the internal combustion engine 12.

The clutch 16 is arranged between the input shaft 20 and an output shaft 21 and is both a magneto-rheological and an eddy-current clutch 16. The clutch 16 connects the input shaft 20 with the output shaft 21 in the engaged clutch state, as shown in FIG. 1, and disconnects the output shaft 21 from the input shaft 20 in the disengaged state, as shown in FIG. 2.

The output shaft 21 of the clutch 16 is directly coupled to a vacuum pumping unit 18 with a pump rotor 19. The clutch 16 is provided with two clutch bodies 22,24, an input clutch body 22 and an output clutch body 24, defining a clutch liquid gap 26 therebetween filled with a magneto-rheological clutch liquid 28, an axially shiftable permanent magnet element 30 held by a separate ferromagnetic shift body 54, a pretension element 44 designed as a spring and a pneumatic actuator 42.

The clutch bodies 22,24 are both cup-shaped so that they define a clutch liquid gap 26 between them which is cup-shaped and which has a disk-ring portion and a cylindrical portion.

The permanent magnet element 30 is provided as a circular permanent magnet ring body 32 which is seated in and fixed to the shift body 54. The shift body 54 and the permanent magnet ring body 32 define a shifting unit 52. The input clutch body 24 is provided with a closed pneumatic chamber 57 wherein two or more axial guiding bolts 58 are provided. The shift body 54 is provided with two or more corresponding axial guiding bores 56 so that the guiding bolts 58 and the guiding bores 56 define an axial guiding means for the shift body 54. The shifting unit 52 is therefore arranged so as to be axially shiftable, and co-rotates with the input clutch body 24.

The output clutch body 22 is provided with a cup-like electroconductive element 50 with a ringlike portion and a cylindrical portion. The ringlike portion is provided with radial openings and the cylindrical portion is provided with axial openings to provide a suitable structure for an eddy-current clutch arrangement defined by the electroconductive element 50 and the permanent magnet ring body 32.

The shifting unit 52 is positioned inside of the cup-shaped cavity 27 defined by the cup-shaped clutch liquid gap 26 in the engaged position of the permanent magnet element 30 which is shown in FIG. 1. In the engaged position, the permanent magnet ring body 32 is close to both portions of the clutch liquid gap 26 containing the magneto-rheological clutch liquid 28 therein so that the magnetic field generated by the permanent magnet element 30 penetrates the magneto-rheological clutch liquid 28 inside the clutch liquid gap 26 with a maximum magnetic flux. The engaged permanent magnet element 30 is also close to the electroconductive element 50 so that they both define an engaged eddy-current clutch. As long as the rotational speed of the input clutch body 24 and the output clutch body 22 is different, the output clutch body 22 is driven by the input clutch body 24 by eddy-current-caused forces.

The permanent magnet element 30 is pretensioned by the pretension element 44 into its engaged position as shown in FIG. 1. This arrangement makes the clutch 16 failsafe because the permanent magnet element 30 is always pushed into its engaged position if the pneumatic actuator 42 should fail.

When the pneumatic actuator 42 is activated, the closed pneumatic chamber 57 of the input clutch body 22 is evacuated by the pneumatic actuator 42 so that the shifting unit 52 is pulled into its disengaged position, as shown in FIG. 2.

The pneumatic actuator 42 is controlled by a control unit 40 which is also connected to a pressure sensor 15 of the brake assistance unit 14 via a signal line. The control unit 40 engages and disengages the clutch 16 dependent on the pneumatic pressure in the working chamber of the brake assistance unit 14. As long as the pneumatic pressure in the working chamber of the brake assistance unit 14 is below a critical pressure value, the clutch 16 remains disengaged by activation of the pneumatic actuator 42 so that the shiftable magnet element 30 is pulled into and held in its disengaged position, as shown in FIG. 2. In the disengaged position of the permanent magnet element 30, the magnetic field penetrating flux of the clutch liquid gap 26 is relatively low so that the viscosity of the magneto-rheological clutch liquid is relatively low. The permanent magnet ring body 32 is also remote from the electroconductive element 50 so that no eddy-current effect is present. As a consequence, the clutch slip is high so that the clutch is more or less disengaged.

As soon as the pneumatic pressure in the working chamber of the brake assistance unit 14 exceeds a critical pressure value, the clutch 16 is switched into the engaged state by not activating the actuator 42 so that the shiftable magnet element 30 is pushed into its engaged position by the pretension element 44, as shown in FIG. 1. In this state the magnetic field flux penetrating the clutch liquid gap 26 is relatively high so that the viscosity of the magneto-rheological clutch liquid is relatively high. A strong torque is also transmitted from the input clutch body 24 to the output clutch body 22 caused by the eddy-current effect. The clutch slip is therefore low so that the clutch is more or less engaged. In this engaged state, the output shaft 21 rotates with the same rotational speed as the input shaft 20. The output shaft 21 drives a pump rotor 19 of the pumping unit 18 so that the working chamber of the brake assistance unit 14 is evacuated until the pneumatic pressure in the working chamber falls below the critical pressure value.

Figure 3:
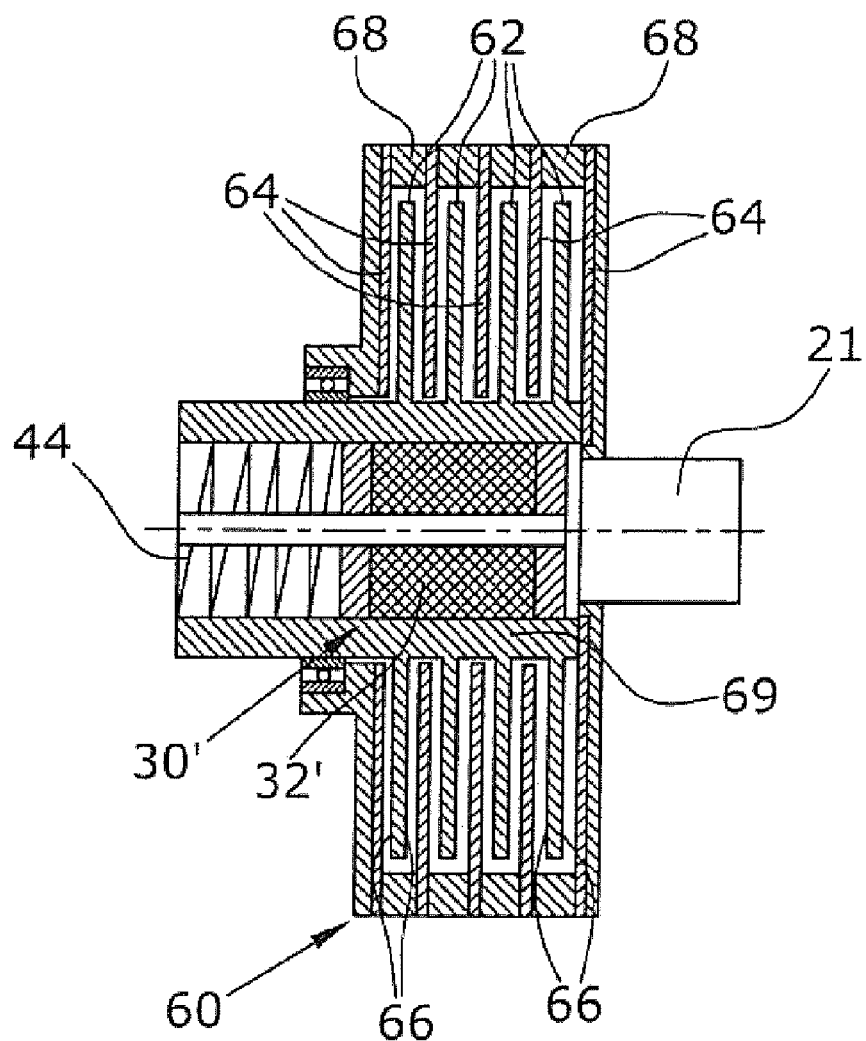
FIG. 3 shows an embodiment of a clutch realized as a multi-disc clutch in a longitudinal cross-section in the engaged state.
Figure 4:
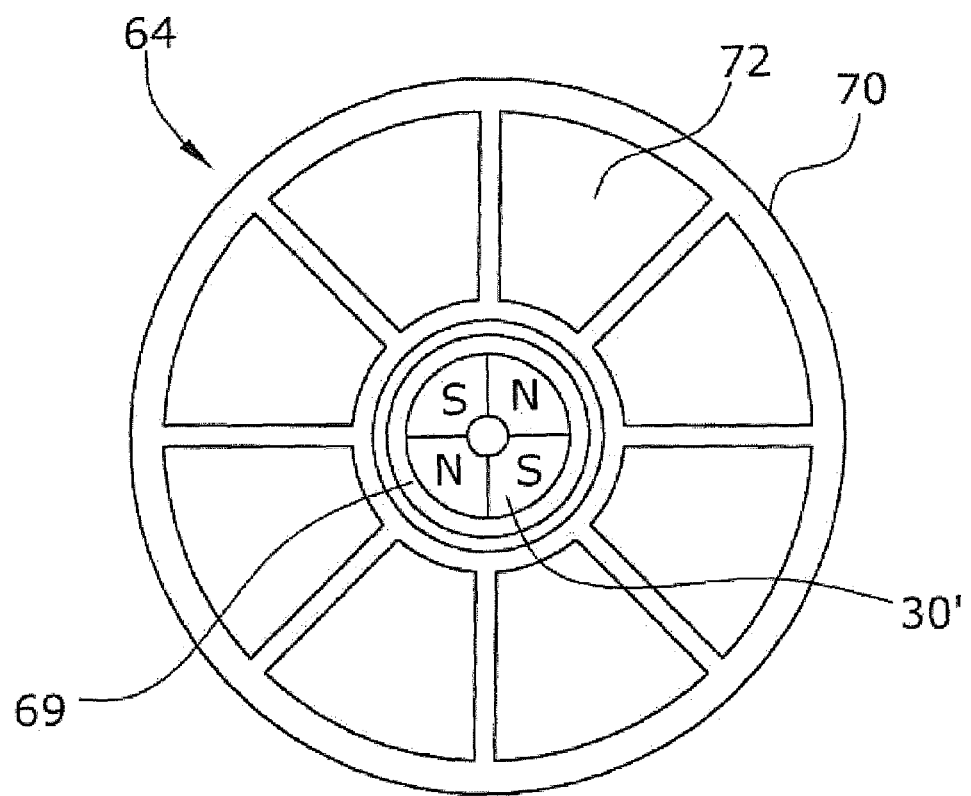
FIG. 4 shows the radial cross section of radial output disc of the clutch of FIG. 3.

FIGS. 3 and 4 show a second embodiment of a clutch arrangement which is provided as a multi-disc clutch 60. The multi-disc clutch 60 is provided with four radial input disks 62 of ferromagnetic material and five radial output disks 64 of a highly electroconductive material, for example copper.

The input disks 62 are provided axially between the output disks 64. At the outer circumference of the output disks 64, connection rings 68 made out of a non-ferromagnetic material are provided. The permanent magnet element 30' is realized as a ring magnet which can be magnetized axially or circumferentially so that four magnet sectors are present as shown in FIG. 4. The output disks 64 define the electroconductive elements 70 and are provided with eight sector-like openings 72 so that the electroconductive elements 70 are formed as a spoke wheels. Between the discs 62, 64, radial ring-like clutch liquid gaps 66 are defined wherein the magneto-rheological clutch liquid is present.

The present invention is not limited to embodiments described herein; reference should be had to the appended claims.

What is claimed is:

1. A mechanical combustion-engine-driven fluid pump comprising:
   an input shaft configured to be directly driven by a combustion engine;
   a pumping unit comprising a pump rotor; and
   a clutch provided as a combined magneto-rheological and eddy-current clutch arranged between the input shaft and the pump rotor, the clutch comprising,
      an input clutch body,
      an output clutch body, the clutch being configured to transfer a rotation of the input clutch body to the output clutch body in an engaged clutch state,
      a closed clutch liquid gap formed between the input clutch body and the output clutch body, the closed clutch liquid gap being filled with a magneto-rheological clutch liquid, an electroconductive element configured to co-rotate with the output clutch body, a permanent magnet element configured to co-rotate with the input clutch body and to be shiftable between, an engaged position where a magnetic field of the permanent magnet element penetrates the closed clutch liquid gap with a high magnetic flux and the permanent magnet element is in a position which is close to the electroconductive element, and a disengaged position where the magnetic field of the permanent magnet element in the closed clutch liquid gap is less than in the engaged position, and the permanent magnet element is in a position which is remote from the electroconductive element, and an actuator configured to move the permanent magnet element between the engaged position and the disengaged position, wherein, the permanent magnet element does not contact the magneto-rheological clutch liquid.

2. The mechanical combustion-engine-driven fluid pump as recited in claim 1, wherein the permanent magnet element is provided so as to be shiftable in an axial direction.

3. The mechanical combustion-engine-driven fluid pump as recited in claim 1, wherein, the input clutch body comprises an input clutch body axial guide, the permanent magnet element comprises a shift body which comprises a permanent magnet body which comprises a permanent magnet body axial guide, and the permanent magnet body axial guide is configured to interact with the input clutch body axial guide.

4. The mechanical combustion-engine-driven fluid pump as recited in claim 1, wherein the electroconductive element is provided as a part of the output clutch body.

5. The mechanical combustion-engine-driven fluid pump as recited in claim 1, wherein, the input clutch body and the output clutch body are each configured to have a cup-shape so that the closed clutch liquid gap is provided as a cup-shaped gap defining a cup-shaped cavity between the input clutch body and the output clutch body, and the permanent magnet element, in the engaged position, is positioned inside the cup-shaped cavity.

6. The mechanical combustion-engine-driven fluid pump recited in claim 1, wherein the clutch is provided as a multi-disc clutch comprising at least two radial input disks and at least two radial output disks, the at least two radial input disks and the at least two radial output disks defining radial clutch liquid gaps therebetween.

7. The mechanical combustion-engine-driven fluid pump recited in claim 6, wherein, the at least two radial input disks are ferromagnetic, and the at least two radial output disks are provided as electroconductive elements.

8. The mechanical combustion-engine-driven fluid pump as recited in claim 6, wherein the at least two radial output disks each comprise an opening.

9. The mechanical combustion-engine-driven fluid pump as recited in claim 1, further comprising a pretension element which is configured to pretension the permanent magnet element into the engaged position.

10. The mechanical combustion-engine-driven fluid pump as recited in claim 1, wherein the actuator is an electromagnetic actuator.

11. The mechanical combustion-engine-driven fluid pump as recited in claim 1, wherein the actuator is a vacuum actuator.

* * * * *